(12) United States Patent
Okawara

(10) Patent No.: US 8,390,960 B2
(45) Date of Patent: Mar. 5, 2013

(54) HEAD SUSPENSION

(75) Inventor: Osamu Okawara, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 603 days.

(21) Appl. No.: 12/557,854

(22) Filed: Sep. 11, 2009

(65) Prior Publication Data

US 2010/0073825 A1    Mar. 25, 2010

(30) Foreign Application Priority Data

Sep. 24, 2008   (JP) .................................. 2008-243685

(51) Int. Cl.
*G11B 21/10*      (2006.01)
*G11B 5/596*      (2006.01)
*G11B 21/21*      (2006.01)

(52) U.S. Cl. .................................. 360/294.4; 360/245.2

(58) Field of Classification Search ............... 360/294.4, 360/245.2, 244.2, 244.5
See application file for complete search history.

(56) References Cited

U.S. PATENT DOCUMENTS

| | | | |
|---|---|---|---|
| 6,597,541 B2* | 7/2003 | Nishida et al. | 360/294.4 |
| 6,661,619 B2* | 12/2003 | Nishida et al. | 360/294.4 |
| 6,791,783 B2* | 9/2004 | Nakagawa | 360/75 |
| 7,167,344 B2* | 1/2007 | Nakagawa et al. | 360/294.4 |
| 2010/0073824 A1* | 3/2010 | Nojima | 360/294.4 |
| 2010/0085663 A1* | 4/2010 | Ando et al. | 360/244.2 |

FOREIGN PATENT DOCUMENTS

| | | |
|---|---|---|
| JP | 7-133474 | 5/1995 |
| JP | 2000315367 A * | 11/2000 |
| JP | 2001046940 A * | 2/2001 |
| JP | 2001-297547 | 10/2001 |
| JP | 2002-050140 | 2/2002 |
| JP | 2002-184140 | 6/2002 |
| JP | 2002-251854 | 9/2002 |
| JP | 2002251853 A * | 9/2002 |

OTHER PUBLICATIONS

English-machine translation of Watabe (JP 2002-251853 A), published on Sep. 6, 2002.*

* cited by examiner

*Primary Examiner* — Will J Klimowicz
(74) *Attorney, Agent, or Firm* — Jordan and Hamburg LLP

(57) ABSTRACT

A head suspension has a piezoelectric element that deforms in response to an applied voltage, a base plate provided with an opening to which the piezoelectric element is attached, and a load beam fixed to the base plate so that a front end of the load beam moves in a sway direction according to deformation of the piezoelectric element. The head suspension includes an adhesive applied to a gap between the piezoelectric element and the opening, to attach the piezoelectric element to the opening. The adhesive has a thixotropic characteristic and is sol when applied to the gap.

4 Claims, 10 Drawing Sheets

HEAD SUSPENSION

BACKGROUND OF THE INVENTION

1. Field of the Invention

The present invention relates to a head suspension having a piezoelectric element that is attached to the head suspension with an adhesive and deforms in response to a voltage applied thereto.

2. Description of Related Art

Small-sized, precision information devices are rapidly advancing and needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

The magnetic disk drives have an urgent issue to solve, i.e., increasing storage capacity. The storage capacity of a magnetic disk drive will increase if the storage capacity of each magnetic disk contained in the magnetic disk drive increases. The storage capacity or recording density of a magnetic disk will increase, without changing the diameter thereof, if the number of tracks per inch (TPI) on the magnetic disk increases. For this, the width of each track on the magnetic disk must be narrow. To handle such narrow tracks on a magnetic disk, a magnetic head of a head suspension in the magnetic disk drive must conduct precise positioning in a direction across the tracks. For realizing the precise positioning, there is a need of an actuator capable of accurately moving and positioning the magnetic head of a head suspension within a very small area.

To meet the need, the applicant of the present invention has proposed in Japanese Unexamined Patent Application Publication No. 2002-50140 a head suspension for a disk drive, including a base plate, a connection plate having a hinge thinner than the base plate, a load beam provided with a flexure and a magnetic head, and a pair of piezoelectric elements.

This related art employs a dual actuator system that involves, for a positioning purpose, a voice coil motor and the piezoelectric elements made of PZT (lead zirconate titanate).

The piezoelectric elements minutely drive a front end of the load beam in a widthwise direction (sway direction) of the head suspension. Compared with a single actuator system employing only a voice coil motor, the dual actuator system employing the voice coil motor and piezoelectric elements more precisely positions the magnetic head attached to the front end of the head suspension.

An important issue for the head suspension employing the dual actuator system is how to mount the piezoelectric elements on the head suspension.

As an approach to address the issue, the applicant of the present invention has proposed in Japanese Unexamined Patent Application Publication No. 2002-184140 (in particular, an adhesive 80 in FIGS. 4 and 9) a head suspension for a disk drive having a load beam, a flexure attached to the load beam, an actuator base including a base plate, and a pair of piezoelectric elements. The actuator base has an opening in which the pair of piezoelectric elements is installed with an electrically insulative adhesive.

According to this related art, the piezoelectric elements are set at a predetermined position on the actuator base with a gap being secured between the piezoelectric elements and the actuator base and the adhesive is applied into the gap.

If the quantity of the adhesive applied into the gap is too small, a bonding strength will be insufficient to correctly transmit a displacement of the piezoelectric elements to the load beam. If the adhesive quantity is too large, the applied adhesive will ooze and spread. If the spread adhesive reaches the flexure of the load beam, it will deteriorate the rigidity balance and vibration characteristic of the head suspension.

SUMMARY OF THE INVENTION

An object of the present invention is to provide a head suspension capable of correctly transmitting a displacement of a piezoelectric element to a load beam and properly keeping a rigidity balance and vibration characteristic.

In order to accomplish the object, an aspect of the present invention provides a head suspension having a piezoelectric element that deforms in response to a voltage applied thereto, a base provided with an attaching part to which the piezoelectric element is attached, and a load beam that is fixed to the base so that a front end of the load beam moves in a sway direction according to the deformation of the piezoelectric element. The head suspension has an adhesive applied to a gap between the piezoelectric element and the attaching part, to attach the piezoelectric element to the attaching part, the adhesive having a thixotropic characteristic and being sol when applied to the gap.

According to this aspect of the present invention, the adhesive is applied to a gap between the piezoelectric element and the attaching part, to attach the piezoelectric element to the attaching part. The adhesive has a thixotropic characteristic and is sol when applied to the gap. Namely, the adhesive applied to the gap between the piezoelectric element and the attaching part is initially sol, and therefore, is correctly applied into the gap. After application, the adhesive that is initially sol gradually changes to gel, and therefore, never oozes or spreads. This realizes the head suspension capable of correctly transmitting a displacement of the piezoelectric element to the load beam and properly keeping a rigidity balance and vibration characteristic.

DETAILED DESCRIPTION OF EMBODIMENTS

Head suspensions according to embodiments of the present invention will be explained in detail with reference to the drawings.

First, a head suspension according to Embodiment 1 of the present invention will be explained.

Figure 1:
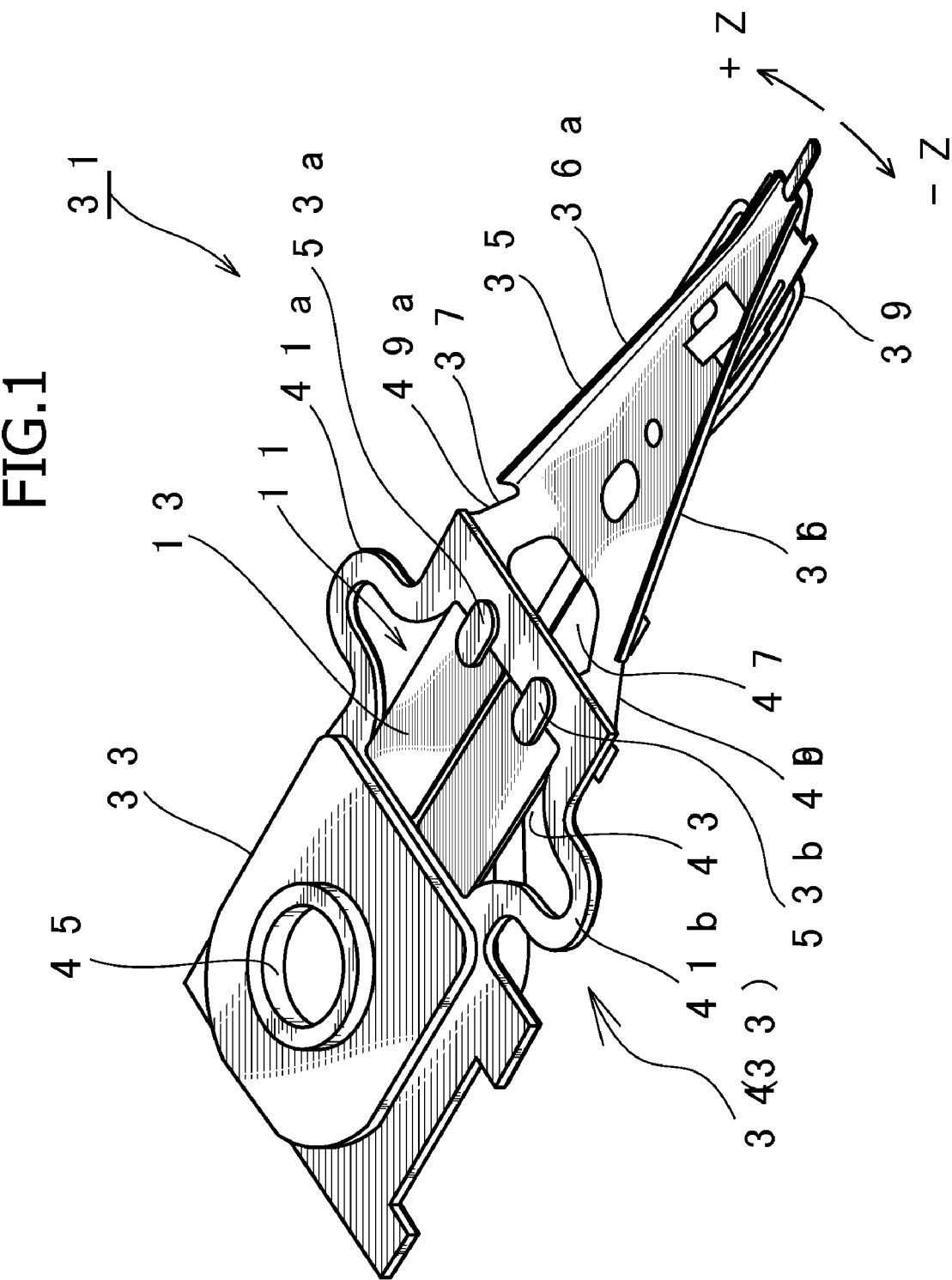
FIG. 1 is a perspective view illustrating a head suspension according to Embodiment 1 of the present invention.

FIG. 1 is a perspective view illustrating the head suspension 31 according to Embodiment 1 of the present invention.

The head suspension 31 includes a piezoelectric actuator 11 consisting of a piezoelectric element 13 that deforms in response to a voltage applied thereto, a base plate 33 (corresponding to the attaching part or the base stipulated in the claims), a load beam 35, a connection plate 37 functioning as a hinge, and the like. The base plate 33 has an opening 43 in which the piezoelectric element 13 is embedded. The piezoelectric element 13 deforms in response to an applied voltage, to move a front end of the load beam 35 in a sway direction, i.e., a widthwise direction of the head suspension 31.

The base plate 33 is made of, for example, a stainless steel thin plate having a thickness of about 150 to 200 μm. The base plate 33 includes a pair of flexible parts 41a and 41b each having a U-shape, the opening 43 for accommodating the piezoelectric element 13, and a circular boss 45. The flexible parts 41a and 41b each are outwardly curved at a location corresponding to a side face of the piezoelectric element 13. The base plate 33 is fixed to a front end of an actuator arm (not illustrated) that is driven and turned by a voice coil motor (not illustrated).

The base plate 33 may be made of light metal such as aluminum alloy or a clad material consisting of light metal and stainless steel. The light metal may reduce the inertia of the base plate 33, increase the resonant frequency of the head suspension 31 in a sway direction, and improve the tracing performance of the head suspension 31.

Instead of providing the base plate 33 with the flexible parts 41a and 41b and opening 43, an actuator plate 34 having the flexible parts 41a and 41b and opening 43 may be used. In this case, a rear end of the actuator plate 34 is laid on the base plate 33 and is fixed thereto by, for example, laser welding. According to the present invention, the head suspension 31 may employ both the base plate 33 and actuator plate 34, or the base plate 33 alone. In the following explanation, the actuator plate 34 is considered to be integral with the base plate 33 for the sake of simplicity of explanation.

The load beam 35 has a flexure 39. The flexure 39 is made of a metal thin plate spring that is thinner and more precise than the load beam 35. A front end of the flexure 39 is provided with a slider (not illustrated) having a magnetic head. The load beam 35 is made of a stainless steel plate having a thickness of about 30 to 150 μm and is designed to apply load onto the slider. The load beam 35 has bent edges 36a and 36b to improve the rigidity of the load beam 35. A rear end of the load beam 35 is integral with the connection plate 37. The load beam 35 may be made of light metal such as aluminum alloy or a clad material consisting of light metal and stainless steel. The light metal may reduce the inertia of the load beam 35, increase the resonant frequency of the head suspension 31 in a sway direction, and improve the tracing performance of the head suspension 31.

The connection plate 37 is made of a resilient metal plate having a thickness of about 30 μm. A part of the connection plate 37 has a hole 47 to reduce the rigidity thereof in a thickness direction. On each side of the hole 47, there are hinges 49a and 49b that bend in the thickness direction. A rear end of the connection plate 37 is laid on a front end of a bottom face of the base plate 33 and is fixed thereto by, for example, laser welding.

The piezoelectric actuator 11 incorporated in the head suspension 31 will be explained.

Figure 2:
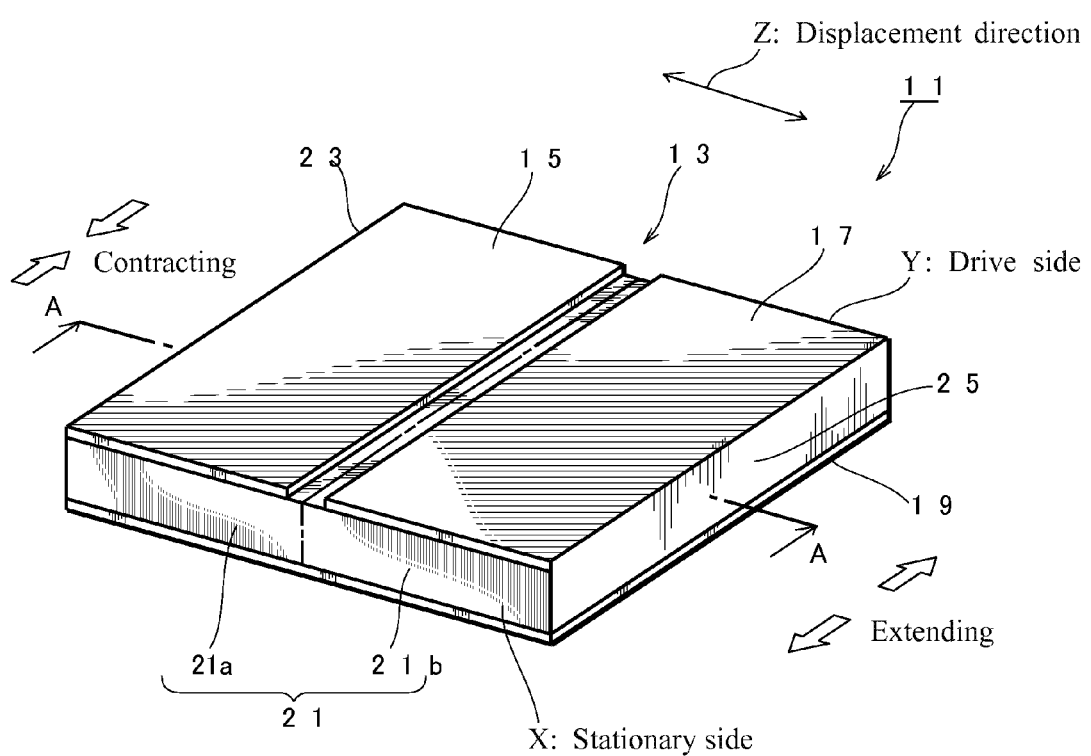
FIG. 2 is a perspective view illustrating a piezoelectric actuator installed in the head suspension.
Figure 3:
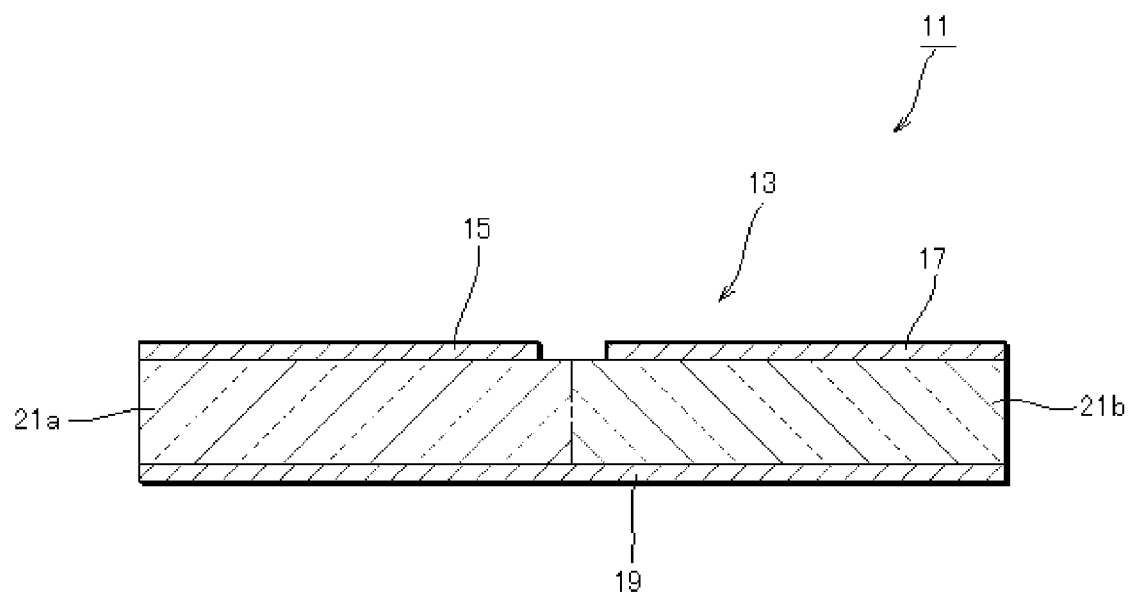
FIG. 3 is a sectional view taken along a line A-A of FIG. 2.

FIG. 2 is a perspective view illustrating the piezoelectric actuator 11 incorporated in the head suspension 31 according to Embodiment 1 and FIG. 3 is a sectional view taken along a line A-A of FIG. 2.

The piezoelectric actuator 11 consists of the piezoelectric element 13 substantially having a rectangular shape. The piezoelectric element 13 deforms in response to an applied voltage, to drive an objective part (the load beam 35). More precisely, the piezoelectric element 13 deforms when a voltage is applied thereto, or when the voltage applied thereto is stopped, or according to the level of a voltage applied thereto.

The piezoelectric element 13 includes first and second electrodes 15 and 17 that are arranged in a common plane and are separated from each other by a predetermined distance, a common electrode opposing the first and second electrodes 15 and 17, and a piezoelectric material 21 arranged between the first and second electrodes 15 and 17 and the common electrode 19. The first and second electrodes 15 and 17 and common electrode 19 may be made of metal having a low contact resistance, such as gold (Au). The first and second electrodes 15 and 17 substantially have the same shape and size. The common electrode 19 is substantially equal in size and shape to a combination of the first and second electrodes 15 and 17.

The piezoelectric material 21 consists of a first piezoelectric material 21a that deforms according to a voltage applied to the first electrode 15 and a second piezoelectric material 21b that deforms according to a voltage applied to the second electrode 17. The first and second piezoelectric materials 21a and 21b are arranged so that they are oppositely polarized. The first and second piezoelectric materials 21a and 21b are made of, for example, piezoelectric ceramics that are polarized with a polarization direction difference of 180 degrees.

Operation of the piezoelectric actuator 11 will be explained. In FIG. 2, a side of the piezoelectric element 13 marked with "X" is a stationary side, a side marked with "Y" is a drive side, the first and second electrodes 15 and 17 are grounded, and the common electrode 19 receives an applied voltage.

When receiving the voltage, the piezoelectric element 13 deforms into a trapezoid with an end face 23 of the first electrode 15 contracting and an end face 25 of the second electrode 17 extending. As a result, the piezoelectric element 13 moves in a direction Z (FIG. 2) by a very small distance, to displace the part (load beam 35) attached to the drive side Y of the piezoelectric element 13. When the common electrode 19 is grounded and the first and second electrodes 15 and 17 receive a voltage, the piezoelectric element 13 moves in a direction −Z (opposite to the direction Z) by a minute distance, to displace the part (load beam 35) attached to the drive side Y of the piezoelectric element 13.

The piezoelectric actuator 11 according to Embodiment 1 needs three electric systems for the first and second electrodes 15 and 17 and common electrode 19. This configuration simplifies wiring to the piezoelectric element 13 and secures the reliability thereof.

Embodiment 1 employs the piezoelectric actuator 11 having the single piezoelectric element 13, to reduce the number of parts, minimize parts management, and reduce the cost of the head suspension 31.

The head suspension 31 according to Embodiment 1 will be explained further.

Figure 4:
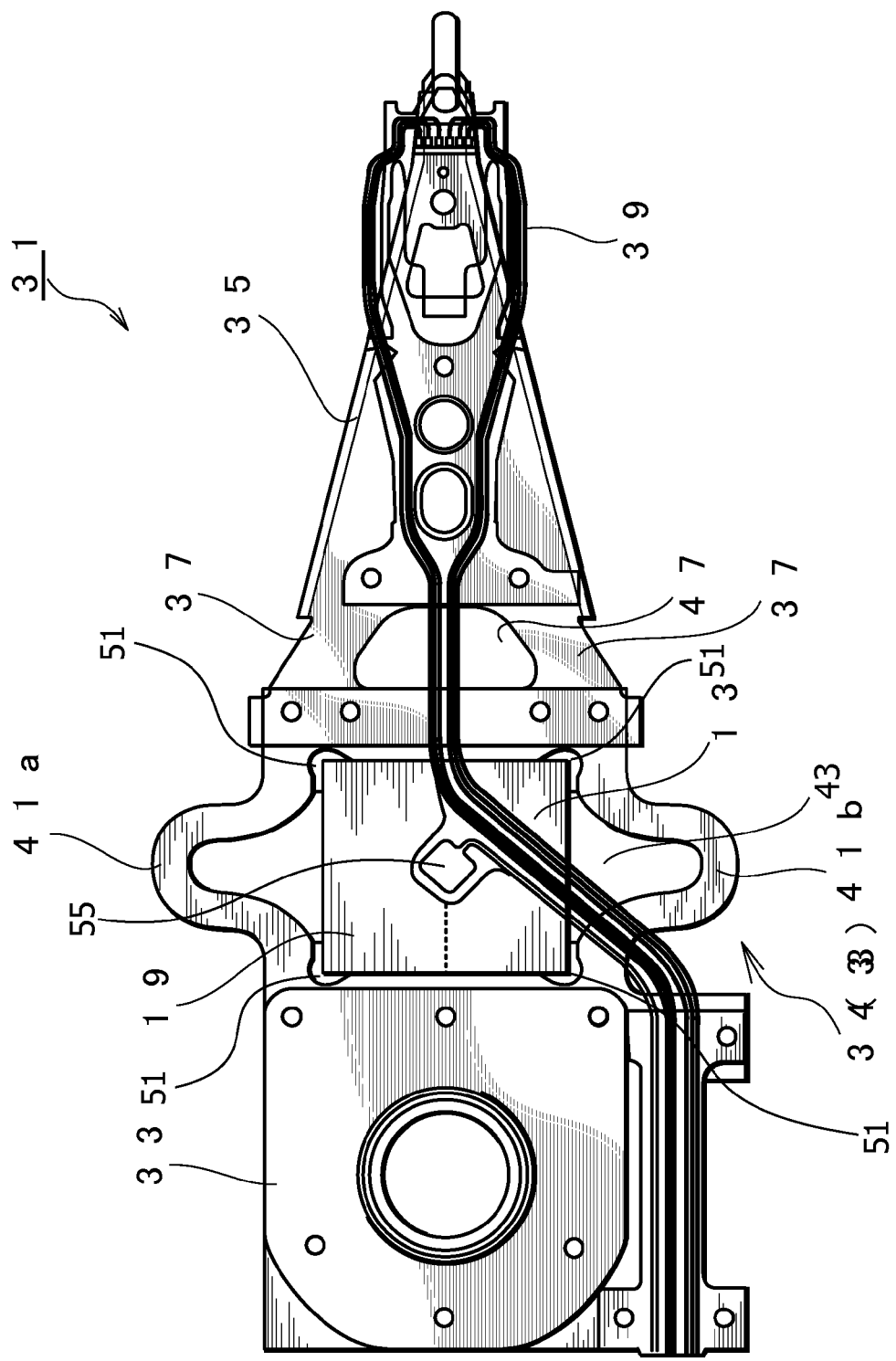
FIG. 4 is a back view illustrating the head suspension according to Embodiment 1.
Figure 5:
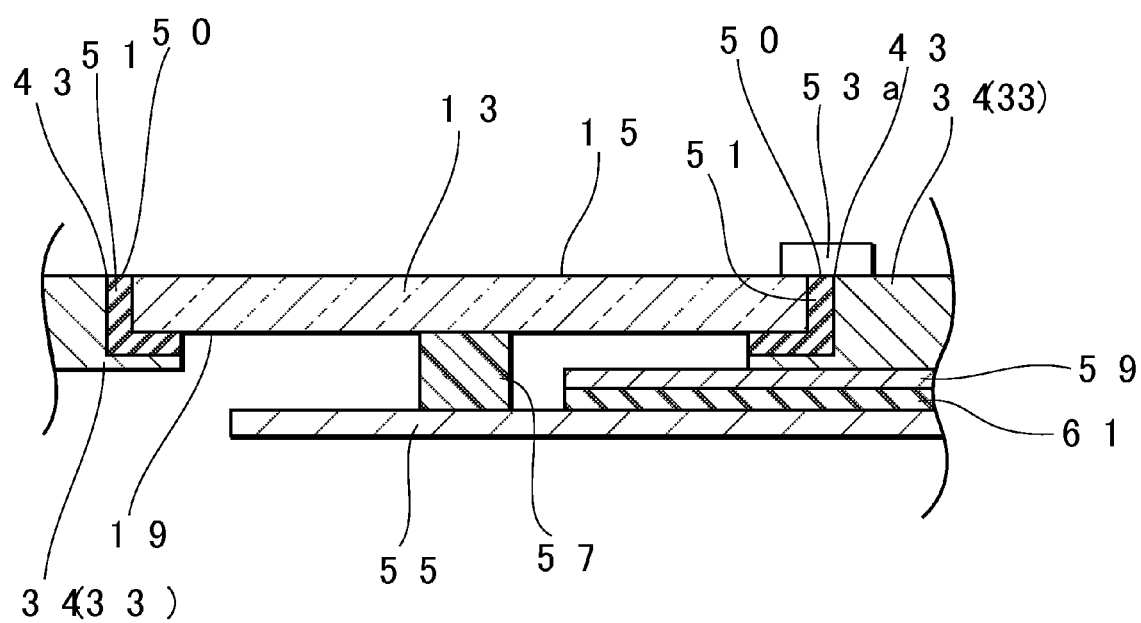
FIG. 5 is a sectional view illustrating an opening of the head suspension of FIGS. 1 and 4 in which the piezoelectric actuator is arranged.
Figure 6:
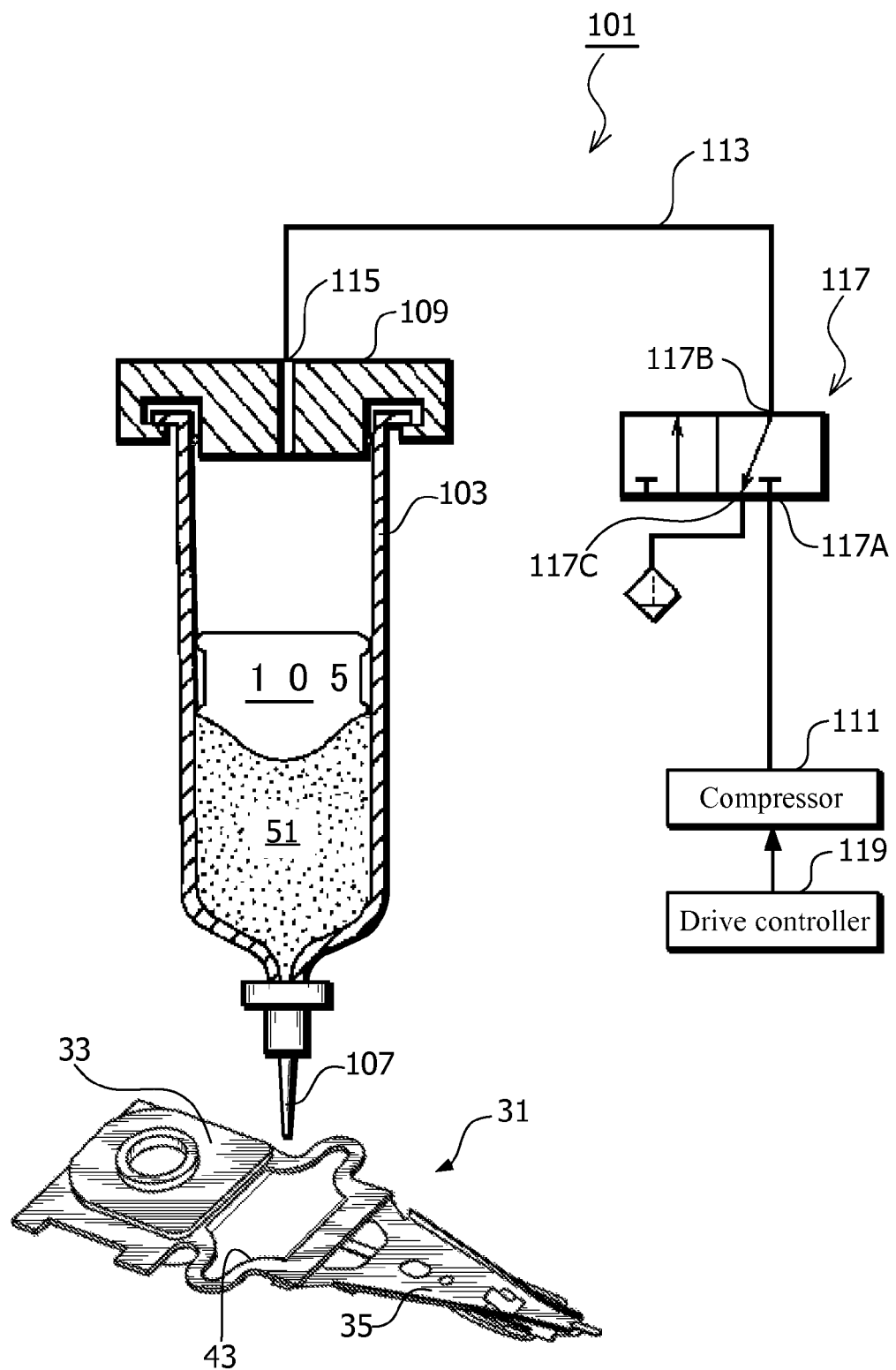
FIG. 6 is a schematic view illustrating an adhesive applying system used to apply an adhesive to a piezoelectric element attaching part of the head suspension.

FIG. 4 is a back view illustrating the head suspension 31, FIG. 5 is a sectional view illustrating the opening 43 of the head suspension 31 in which the piezoelectric actuator 11 is arranged, and FIG. 6 is a schematic view illustrating an adhesive applying system used to apply an adhesive to a piezoelectric element attaching part of the head suspension 31.

The piezoelectric element 13 is embedded in the opening 43 of the base plate 33 with the first and second electrodes 15 and 17 being on top and the common electrode 19 being at the bottom. Front and rear edges of the opening 43 are partly etched so that a nonconductive adhesive 51 properly adheres thereto.

Between the piezoelectric element 13 and the base plate 33 (corresponding to the base or the attaching part stipulated in the claims), there is a gap 50 into which the nonconductive adhesive 51 of proper thickness is filled as illustrated in FIG. 5. The nonconductive adhesive 51 in the gap 50 fixes the piezoelectric element 13 to the base plate 33.

The nonconductive adhesive 51 is a special one having a thixotropic characteristic made by adding a thixotropic agent to a known nonconductive adhesive (including a conductive adhesive containing insulative particles such as silica particles and glass particles). The adhesive 51 is sol when applied to the gap 50. The thixotropic agent prevents the known nonconductive adhesive from dropping or spreading when applied to an object. The thixotropic agent may properly be selected from a group including pulverized silica, ground silica, organic bentonite, talc, smectite, clay, polyamide resin, and the like. The nonconductive adhesive 51 in sol is applied to the piezoelectric element attaching part 33 of the head suspension 31. For this, the adhesive applying system 101 illustrated in FIG. 6 is used, for example.

The adhesive applying system 101 includes a syringe 103 having a circular cross section and containing the nonconductive adhesive 51. The syringe 103 has a piston 105 to thrust out the adhesive 51, a discharge needle 107 at a lower end of the syringe 103, and a circular lid 109 at an upper end of the syringe 103. The lid 109 has a hole 115 to draw compressed air from a compressor 111 through an air pipe 113. The air pipe 113 includes a solenoid valve 117. The solenoid valve 117 has an inlet 117A to receive compressed air from the compressor 111, an outlet 117B to supply compressed air, and a discharge port 117C to discharge compressed air out of the air pipe 113. The outlet 117B is selectively connected to one of the inlet 117A and discharge port 117C. The compressor 111 is connected to a drive controller 119 that totally controls an adhesive applying operation.

In the adhesive applying system 101, the drive controller 119 provides an operational instruction. In response to the instruction, the compressor 111 sends compressed air into the syringe 103. Then, the piston 105 descends to squeeze out the adhesive 51. Under the pressurized state, the thixotropic adhesive 51 is sol and is pushed out of the discharge needle 107. The discharged adhesive 51 that is sol is applied to the piezoelectric element attaching part 33 of the head suspension 31. More precisely, the adhesive 51 that is sol is applied into the gap 50 between the piezoelectric element 13 and the opening 43 of the base plate 33. Since the adhesive 51 is sol, it is correctly applied into the gap 50. After applied into the gap 50, the adhesive 51 gradually changes to gel and loses the liquidity, and therefore, never oozes or spreads. It will be easy, therefore, to control the applying quantity of the adhesive 51, automate the application process of the adhesive 51, correctly transmit a displacement of the piezoelectric element 13 to the load beam 35, and secure a proper rigidity balance and vibration characteristic of the head suspension 31.

The nonconductive adhesive 51 interposed between the piezoelectric element 13 and the opening 43 of the base plate 33 allows a deformation (displacement) of the piezoelectric element 13 to be correctly transmitted to the load beam 35 and the common electrode 19 of the piezoelectric element 13 and the base plate 33 to be surely electrically insulated from each other.

According to Embodiment 1, a part where the base plate 33 and connection plate 37 overlap corresponds to the drive side Y of the piezoelectric actuator 11.

The piezoelectric element 13 is positioned to keep a slight gap with respect to an inner circumferential face of the opening 43. As illustrated in FIG. 5, wiring 55 made of, for example, copper of the flexure 39 is exposed to face the common electrode 19 of the piezoelectric element 13 with a slight space of several tens of micrometers between them. To electrically connect the wiring 55 and the common electrode 19 to each other in the slight space, a conductive adhesive 57 is arranged in the slight space as illustrated in FIG. 5. Like the nonconductive adhesive 51, the conductive adhesive 57 may have thixotropy so that the conductive adhesive 57 is sol when applied. Instead of the conductive adhesive 57, a bonding wire, soldering, ultrasonic bonding, or any other connecting technique may be employed to electrically connect the wiring 55 and the common electrode 19 to each other.

To electrically connect the first and second electrodes 15 and 17 of the piezoelectric element 13 to the base plate 33, a pair of conductive adhesives 53a and 53b is used. Like the nonconductive adhesive 51 or the conductive adhesive 57, the conductive adhesives 53a and 53b may have thixotropy so that the conductive adhesives 53a and 53b are sol when applied. In FIG. 5, a numeral 59 is a metal base of the flexure 39 and 61 is an electrical insulating layer of the flexure 39.

Operation of the head suspension 31 according to Embodiment 1 will be explained. It is assumed that the first and second electrodes 15 and 17 of the piezoelectric element 13 are grounded and the common electrode 19 thereof receives a predetermined voltage.

The end face 23 of the first electrode 15 contracts and the end face 25 of the second electrode 17 extends as illustrated in FIG. 2, and therefore, the piezoelectric element 13 deforms into a trapezoid as a whole. Namely, the piezoelectric element 13 minutely moves in the direction Z to move the load beam 35 on the drive side Y in a sway direction (a widthwise direction of the head suspension 31). If the common electrode 19 is grounded and the first and second electrodes 15 and 17 receive a predetermined voltage, the piezoelectric element 13 minutely moves in the direction −Z to move the load beam 35 on the drive side Y in a sway direction.

In this way, the head suspension 31 incorporating the piezoelectric actuator 11 needs three electric systems for the first and second electrodes 15 and 17 and common electrode 19 of the piezoelectric element 13. This configuration makes wiring work to the piezoelectric element 13 easy and reliable.

The base plate 33 accommodates the piezoelectric element 13 and supports the same from below. In addition, the base plate 33 surrounds the piezoelectric element 13 to easily position the piezoelectric element 13 and protect the brittle piezoelectric element 13 from being damaged.

The common electrode 19 and wiring 55 facing each other are electrically connected to each other through a single connection (57). This configuration reduces the number of wires arranged on the flexure 39 and increases the number of flexures to be produced from a material.

Compared with a head suspension using a pair of piezoelectric elements, the head suspension 31 according to Embodiment 1 employs the single piezoelectric element 13, to reduce the number of parts, simplify parts management, and reduce the cost of the head suspension 31.

A head suspension according to Embodiment 2 of the present invention will be explained.

Figure 7:
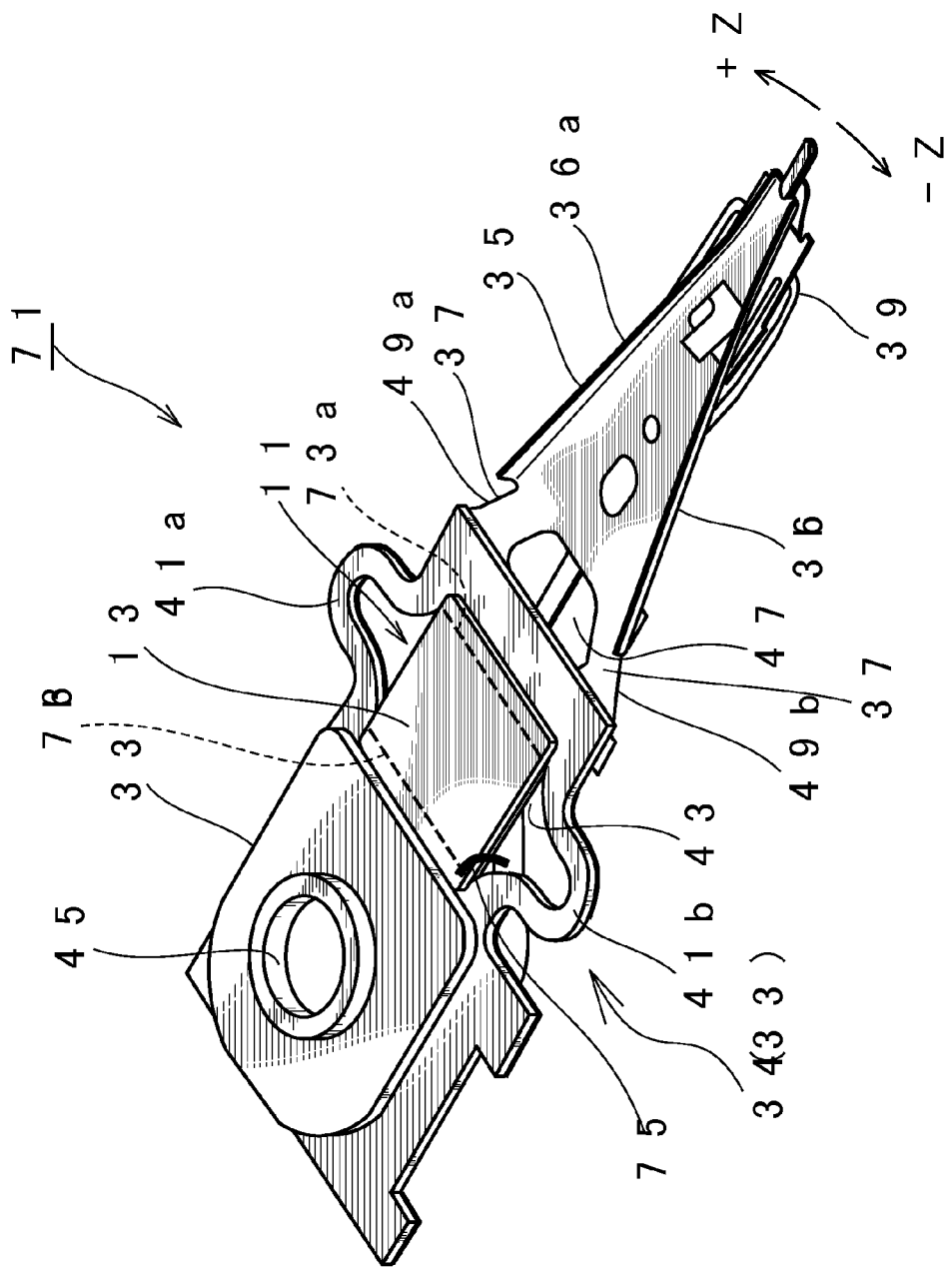
FIG. 7 is a perspective view illustrating a head suspension according to Embodiment 2 of the present invention.
Figure 8:
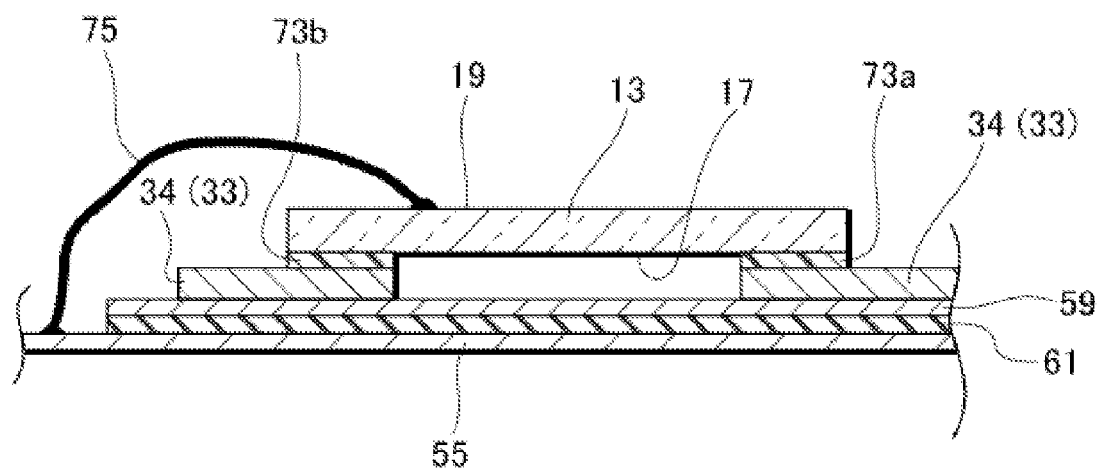
FIG. 8 is a sectional view illustrating an opening of the head suspension of FIG. 7 on which a piezoelectric actuator is arranged.

FIG. 7 is a perspective view illustrating the head suspension 71 according to Embodiment 2 and FIG. 8 is a sectional view illustrating an opening 43 of the head suspension 71 over which the piezoelectric actuator 11 (FIG. 2) is arranged.

The head suspension 71 of Embodiment 2 is basically the same as the head suspension 31 of Embodiment 1, and therefore, only a difference between them will be explained.

The head suspension 71 according to Embodiment 2 includes the piezoelectric actuator 11 consisting of the piezoelectric element 13, a base plate 33 having the opening 43, and a load beam 35. The piezoelectric element 13 is arranged over the opening 43, so that a deformation of the piezoelectric element 13 moves a front end of the load beam 35 in a sway direction, i.e., a widthwise direction of the head suspension 71.

Unlike Embodiment 1 that embeds the piezoelectric element 13 in the opening 43 of the base plate 33, Embodiment 2 arranges the piezoelectric element 13 over the opening 43 of the base plate 33 so that the piezoelectric element 13 bridges the opening 43.

Unlike Embodiment 1 that arranges the piezoelectric element 13 in the opening 43 with the first and second electrode plates 15 and 17 being on top and the common electrode 19 being at the bottom, Embodiment 2 arranges the piezoelectric element 13 on the opening 43 with the common electrode 19 being on top and the first and second electrodes 15 and 17 being at the bottom.

Unlike Embodiment 1 that arranges the nonconductive adhesive 51 at each of the front and rear ends of the opening 43, to fix the piezoelectric element 13 in the opening 43, Embodiment 2 arranges conductive adhesives 73a and 73b at front and rear ends of the opening 43, to fix the piezoelectric element 13 over the opening 43. The conductive adhesives 73a and 73b secure electrical connection between the first and second electrodes 15 and 17 of the piezoelectric element 13 and the base plate 33.

Unlike Embodiment 1 that provides the nonconductive adhesive 51 with thixotropy so that the adhesive 51 is sol when applied, Embodiment 2 provides the conductive adhesives 73a and 73b with thixotropy so that the adhesives 73a and 73b are sol when applied. Namely, the conductive adhesives 73a and 73b that are sol are applied to gaps (FIG. 8) between the piezoelectric element 13 and the base plate 33. The adhesives 73a and 73b are correctly applied into the gaps because they are sol. After the application, the adhesives 73a and 73b gradually become gel to lose liquidity, and therefore, never ooze or disperse. It will be easy, therefore, to control the applying quantities of the adhesives 73a and 73b, automate the application of the adhesives 73a and 73b, correctly transmit a displacement of the piezoelectric element 13 to the load beam 35, and secure a proper rigidity balance and vibration characteristic of the head suspension 71.

Unlike Embodiment 1 that faces the exposed wiring 55 of the flexure 39 to the common electrode 19 of the piezoelectric element 13 and arranges the conductive adhesive 57 between the wiring 55 and the common electrode 19, to secure electric connection between them, Embodiment 2 employs a bonding wire 75 to secure electric connection between wiring 55 of a flexure 39 and the common electrode 19 of the piezoelectric element 13. Instead of the bonding wire 75, a jumper trace or any other connection technique is employable. Alternatively, a part of the wiring 55 is exposed, the exposed part is plated with gold, and the gold-plated part may directly be ultrasonic-bonded to the common electrode 19.

Operation of the head suspension 71 according to Embodiment 2 will be explained. It is assumed that the first and second electrodes 15 and 17 of the piezoelectric element 13 are grounded and the common electrode 19 thereof receives a predetermined voltage.

As illustrated in FIG. 2, the end face 23 of the first electrode 15 contracts and the end face 25 of the second electrode 17 extends, and therefore, the piezoelectric element 13 deforms into a trapezoid as a whole. Namely, the piezoelectric element 13 minutely moves in the direction Z to move the load beam 35 on the drive side Y in a sway direction (a widthwise direction of the head suspension 71). If the common electrode 19 is grounded and the first and second electrodes 15 and 17 receive a predetermined voltage, the piezoelectric element 13 minutely moves in the direction -Z to move the load beam 35 on the drive side Y in a sway direction.

Compared with a head suspension that uses a piezoelectric actuator consisting of a pair of piezoelectric elements and needs four electric connections for four electrodes of the pair of piezoelectric elements, the head suspension 71 according to Embodiment 2 employs the single piezoelectric element 13 and needs three electric connections for the first and second electrodes 15 and 17 and common electrode 19, to simplify wiring work to the piezoelectric element 13 and secure the reliability thereof.

According to Embodiment 2, the common electrode 19 is electrically connected to the wiring 55 of the flexure 39 through the bonding wire 75 alone. This reduces the number of wires laid on the flexure 39 and increases the number of flexures to be produced from a material.

Compared with the head suspension having a pair of piezoelectric elements, the head suspension 71 according to Embodiment 2 employs the single piezoelectric element 13, to reduce the number of parts, minimize parts management, and reduce the cost of the head suspension 71.

To secure electric connection and mechanical joint strength, the head suspension 31 of Embodiment 1 employs the nonconductive adhesive 51 and conductive adhesives 53a and 53b. For the same purpose, the head suspension 71 of Embodiment 2 employs the conductive adhesives 73a and 73b, to reduce the number of processes and cost.

The present invention is not limited to the above-mentioned embodiments and is modifiable without departing from the gist and technical idea thereof mentioned in the claims and specification. Head suspensions according to such modifications also fall in the scope of the present invention.

For example, according to a modification of the present invention, the flexible parts 41a and 41b and the opening 43 are formed on the actuator plate 34 instead of the base plate 33. For this, the term "base plate" means the base plate 33 alone or the base plate 33 plus the actuator plate 34. Accordingly, the base stipulated in the claims may be read as a base plate or an actuator plate. For example, the opening (attaching part) formed in the base plate (base) may be read as the opening (attaching part) formed in the actuator plate (base).

Figure 9:
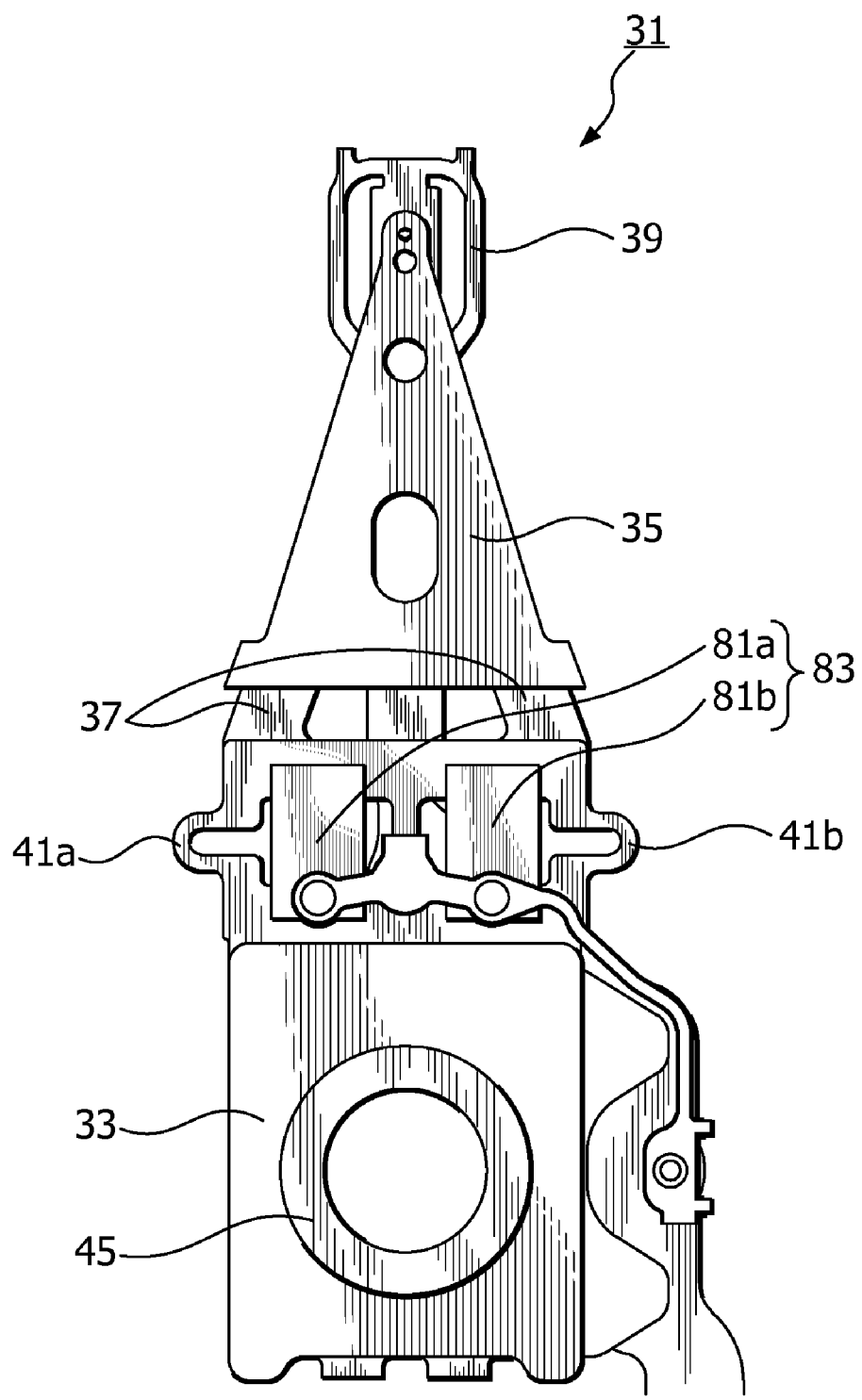
FIG. 9 is a perspective view illustrating a head suspension according to a modification of the present invention.

According to the embodiments of the present invention, the piezoelectric actuator 11 employs one piezoelectric element 13 and arranges the piezoelectric element 13 with respect to the opening 43 of the base plate 33. This does not limit the present invention. According to another modification of the present invention illustrated in FIG. 9, a piezoelectric actuator 83 employs a pair of piezoelectric elements 81a and 81b and the piezoelectric elements 81a and 81b are set in an opening (attaching part) 43 of a base plate 33 with an adhesive provided with thixotropy.

According to Embodiment 1, the nonconductive adhesive 51 having thixotropy is applied into the gap 50 to fix the piezoelectric element 13 in the opening (attaching part) 43 of the base plate 33. This does not limit the present invention.

Figure 10:
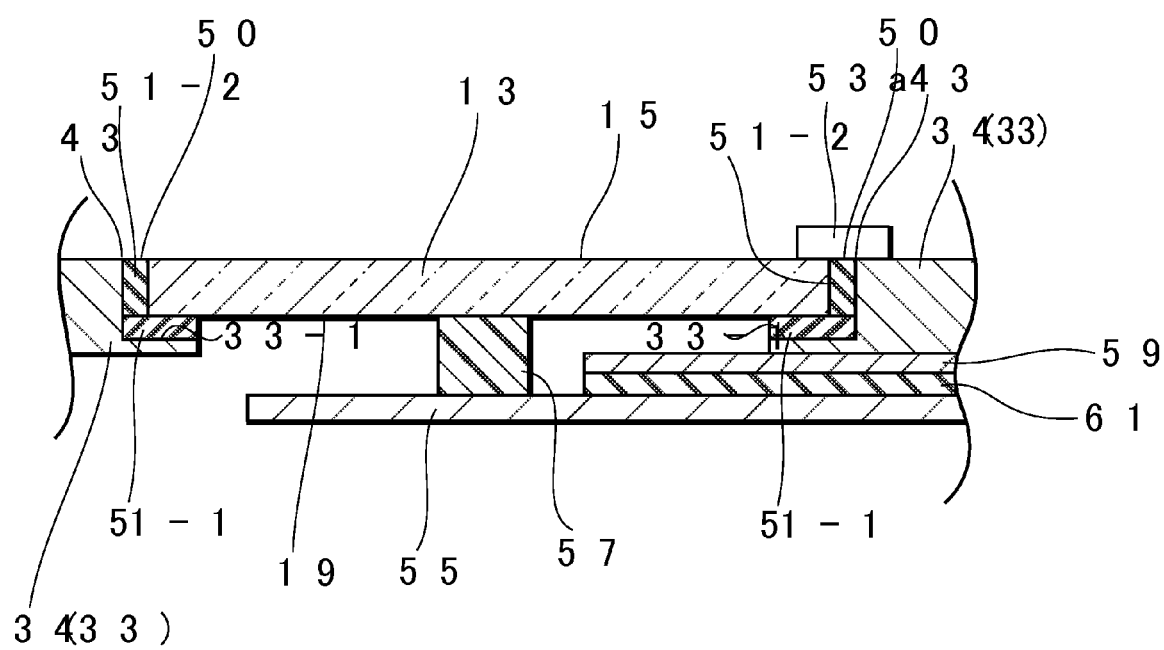
FIG. 10 is a sectional view illustrating an opening of a head suspension in which a piezoelectric actuator is arranged according to another modification of the present invention.

According to still another modification of the present invention illustrated in FIG. 10, a nonconductive adhesive 51-1 having thixotropy is applied onto a receiving part 33-1 of a base plate 33, a piezoelectric element 13 is placed on the adhesive 51-1 on the receiving part 33-1, and a gap 50 between the piezoelectric element 13 and an opening 43 of the base plate 33 is filled with a nonconductive adhesive 51-2 having thixotropy, to thereby set the piezoelectric element 13 in the opening (attaching part) 43 of the base plate 33.

What is claimed is:

1. A head suspension having a piezoelectric element that deforms in response to a voltage applied thereto, a base provided with an attaching part to which the piezoelectric element is attached, and a load beam that is fixed to the base so that a front end of the load beam moves in a sway direction according to the deformation of the piezoelectric element, the head suspension comprising:

a nonconductive adhesive applied to a gap between the piezoelectric element and the attaching part, to attach the piezoelectric element to the attaching part, the nonconductive adhesive being combined with a thixotropic agent so that the nonconductive adhesive comprises a viscosity enabling the nonconductive adhesive to maintain a controlled state so as to be controlled when applied to the gap so that the nonconductive adhesive is prevented from spreading away from the gap and beyond the attachment surfaces of the piezoelectric element and the attaching part, the nonconductive adhesive having a thixotropic characteristic in which the nonconductive adhesive is sol when applied to the gap and changes to gel in the gap so as to maintain the controlled state thereof while at the same time enabling positioning of the piezoelectric element relative to the attaching part so as to maintain a space therebetween, the attaching part being an opening formed in the base, and the piezoelectric element is embedded in the opening, the gap being defined between the opening and the piezoelectric element and filled with the nonconductive adhesive so that the nonconductive adhesive has a respective side face that is flush with both a surface of the piezoelectric element and a surface of the base, and a conductive adhesive extends between the surface of the piezoelectric element and the base.

2. The head suspension of claim 1, wherein:
the adhesive is applied to the gap in such a way as to fill the gap.

3. The head suspension of claim 1, wherein:
the adhesive that is sol when applied to the gap is contained in a syringe and is pressurized in the syringe when applied to the gap.

4. The head suspension of claim 1, wherein:
the base is one of a base plate and an actuator plate.

* * * * *